(12) United States Patent
Fermgård

(10) Patent No.: US 7,671,850 B2
(45) Date of Patent: Mar. 2, 2010

(54) ELECTRONIC PEN

(75) Inventor: Björn Fermgård, Lund (SE)

(73) Assignee: Anoto AB, Lund (SE)

( * ) Notice: Subject to any disclaimer, the term of this patent is extended or adjusted under 35 U.S.C. 154(b) by 1810 days.

(21) Appl. No.: 10/170,542

(22) Filed: Jun. 14, 2002

(65) Prior Publication Data

US 2002/0190966 A1 Dec. 19, 2002

Related U.S. Application Data

(60) Provisional application No. 60/298,085, filed on Jun. 15, 2001.

(51) Int. Cl.
*G09G 5/00* (2006.01)

(52) U.S. Cl. ...................... 345/179; 425/424

(58) Field of Classification Search .......... 345/178–183
See application file for complete search history.

(56) References Cited

U.S. PATENT DOCUMENTS 5,012,049 A 4/1991 Schier
5,294,792 A 3/1994 Lewis et al.
5,434,371 A 7/1995 Brooks
5,571,997 A 11/1996 Gray et al.
5,661,506 A 8/1997 Lazzouni et al.
5,852,434 A 12/1998 Sekendur
6,104,388 A 8/2000 Nagai et al.
6,130,666 A 10/2000 Persidsky

FOREIGN PATENT DOCUMENTS

WO WO 00/73983 A1 12/2000
WO WO 01/30589 A1 5/2001

OTHER PUBLICATIONS

Dymetman & Copperman, X002328425 "Intelligent Paper", Xerox Research Centre Europe, Meylan, France, pp. 392-406.

*Primary Examiner*—Reginia Liang
*Assistant Examiner*—Duc Quang Dinh
(74) *Attorney, Agent, or Firm*—Birch, Stewart, Kolasch & Birch, LLP.

(57) ABSTRACT

An electronic pen has a body which comprises a casing consisting of at least two casing parts which are joined to be separable, and electronic equipment arranged inside the casing. A girdle is arranged with a close fit round the joined casing parts. The casing and the girdle have coacting locking means which limit the movement of the girdle in the longitudinal direction of the pen in such manner that at least the girdle is destroyed as the locking is broken.

19 Claims, 2 Drawing Sheets

ELECTRONIC PEN

This application claims priority on provisional Application No. 60/298,085 filed on Jun. 15, 2001, the entire contents of which are hereby incorporated by reference.

FIELD OF THE INVENTION

The present invention relates to an electronic pen which has a body comprising a casing consisting of at least two casing parts which are joined to be separable, and electronic equipment arranged inside the casing. The invention also concerns a method of providing a pen with a tamper proof seal.

BACKGROUND ART

Electronic pens are known, which have sensors and electronic devices for digitally recording what is being written by means of the pen. Different kinds of sensors can be mounted in the pen in order to determine its position, for instance acceleration sensors as described in U.S. Pat. No. 5,434,371 and U.S. Pat. No. 6,130,666, optical sensors as described in U.S. Pat. Nos. 5,294,792, 5,852,434 and WO 00/73983, pressure sensors as described in U.S. Pat. No. 6,104,388, or mechanical sensors as described in U.S. Pat. No. 5,294,792 and U.S. Pat. No. 6,130,666. In other types of electronic pens, use is made of triangulation of signals (for instance light, sound or IR radiation) for position determination, which is described in U.S. Pat. No. 5,012,049.

The above-described and other inner components of the pen may necessitate service, exchange, calibration and other measures, and therefore the pen body is most suitably designed so as to allow access to the components. For this purpose and to facilitate the assembly of the pen, the pen body comprises a casing which accommodates the components that are to be accessible and consists of casing parts which are joined to be separable. The separable joining is implemented with e.g. screws. A problem in the context is that consequently the casing can also can be opened, for instance, by a user who does not have the necessary knowledge of handling the components in the interior of the pen. It is difficult, when the pen is handed in for service, to determine whether the deficiencies that may have arisen in the inner components of the pen are caused by the pen being opened by a person who is not authorized to perform service of the pen, for which reason a previously granted warranty or guarantee should not be valid.

SUMMARY OF THE INVENTION

An object of the present invention is to suggest a solution to the above problems by providing an electronic pen with a device by means of which it can easily be determined whether the pen has been opened after it was originally assembled or assembled after authorized service.

According to the present invention, this object is achieved by an electronic pen which is of the type described by way of introduction and which is characterized in that a girdle is arranged with a close fit round the joined casing parts, said casing and said girdle having coacting locking means which restrict the movement of the girdle in the longitudinal direction of the pen in such manner that at least the girdle is destroyed as the locking is broken.

Preferred embodiments of the pen are evident from the dependent claims.

Thus the invention is based on the concept that an electronic pen is provided with a girdle which is arranged in such manner as to function as a warranty or tamper proof seal. This solution means that it is not possible to open the pen without this being noticed at a later stage.

The girdle can be recesses or counter sunk in the casing material, in a circumferential groove or recess which is complementary with the girdle, preferably to such an extent that its upper side is aligned with the upper side of the casing or the casing portions adjoining on both sides. In this manner, the actual tamper-proof-sealing role of the girdle can be concealed, thereby reducing the risk that an unauthorized person tries to open the casing parts. The edges of the groove and the edges of the girdle serve as said coacting locking means. However, the edges of the groove and the edges of the girdle serve the same purpose even if the girdle is recessed in the casing material to a greater or smaller extent.

Instead of a groove/recess in the casing parts, the casing parts can be formed, for the above-mentioned purpose, with two circumferential beads, ridges, flanges or the like on their upper side spaced from each other a distance in the longitudinal direction of the pen which is somewhat greater than the length of the girdle, so that the girdle can be accommodated in the space between the beads or the like.

If the pen body, as is often the case, is formed conically at its front end where the user naturally holds a pen, the conicity itself can form locking means which limit the movement of the girdle away from the front end of the pen, i.e. no groove or bead on the pen coacts with the end of the girdle which has the greater opening. Conveniently, the girdle has a truncated conical shape. Furthermore the conicity at the front end of the pen makes it easier to slip the girdle on to the pen.

Of course, the expression "circumferential" in connection with grooves, beads and the like includes not only continuous grooves, beads etc. but also discontinuous grooves in the circumferential direction of the pen even if this may somewhat increase the production cost of the pen and the girdle.

By "close fit" is here not meant that the girdle in its entirety must have a close fit on the underlying casing portion. It is rather meant that at least a portion of the inside of the girdle is designed so that the girdle cannot be removed from the pen without being destroyed. For instance, in connection with the above example with the girdle recessed, the girdle can have one or more beads on its inside, which cause the close fit while the rest of the girdle inside can have a greater distance to the casing. This bead causing a close fit can in itself form the locking means of the girdle for coaction with the locking means of the casing. Nor is "close fit" to be understood in such manner that it should not be possible to turn the girdle relative to the pen, if desired. If it is desired to safely prevent turning of the girdle on the pen, for instance one or two diametrically opposite grooves or slots can be formed in the girdle for engagement with one/two tongues formed on the casing, which also form the locking means, i.e. the above-mentioned discontinuous groove/bead arrangement.

Mounting of the girdle on the pen takes place by slipping the girdle on to the pen from one or the other end, according to the outer shape of the pen, which requires a certain degree of flexibility of the girdle in the radial direction, so that the girdle can be snapped in place on the pen.

It will now be appreciated that the material of the girdle can be selected from a large number of known materials, according to the construction of the close fit and/or the locking means on the girdle and the casing that is selected for the tamper proof seal, according to design requirements and in consideration of the requirement that it should be possible to slip the girdle on to the pen relatively easily and the requirement for economic production of girdle and casing. The material of the girdle should thus be such as to be elastic when being slipped on, but broken or deformed permanently when being removed. Hard plastic, such as polycarbonate, or some other plastic material which is selected among thermoplastics or thermosetting plastics, such as 2-component plastics, can be an alternative for some applications, for instance the above-mentioned recessed fitting into the casing. In other applications, a greater flexibility can be balanced by an inner thickening of the girdle, for instance with the above-described bead for a close fit. To obtain the flexibility that is necessary for the snapping function and to facilitate slipping on of the girdle, slots can also be formed in the girdle, if necessary. Metal is also a convenient material for the girdle as long as its resilience is not so great as to allow the girdle to be removed from the pen, in one or the other direction.

According to a preferred, above-described embodiment of the invention, the girdle is arranged over a longitudinal portion of the casing — over the joined casing parts — where a user holds the pen when used. This gives the advantage that it is possible to give the girdle a double function: as a tamper proof seal and as a means for providing a convenient grip. On the whole, the girdle can be used for design purposes as well, that would otherwise have to be carried out on the casing, which would be more expensive.

Preferably, the girdle is arranged so as to cover the fixing means, for instance the screws, for separable joining of the parts of the casing. This gives the advantage that it is made difficult for a user to open the pen since the fixing means are not visible.

Preferably, the girdle is further formed so as to allow removal from the pen, while destroying the girdle, without damaging the pen body. To this end, the girdle can have a weakened portion that does not break when being slipped on but which yields under the attack of a tool, for instance a pair of pliers.

BRIEF DESCRIPTION OF THE DRAWING

The invention will now be described in more detail with reference to the accompanying schematic drawing which by way of example illustrates a currently preferred embodiment of the invention.

Figure 1:
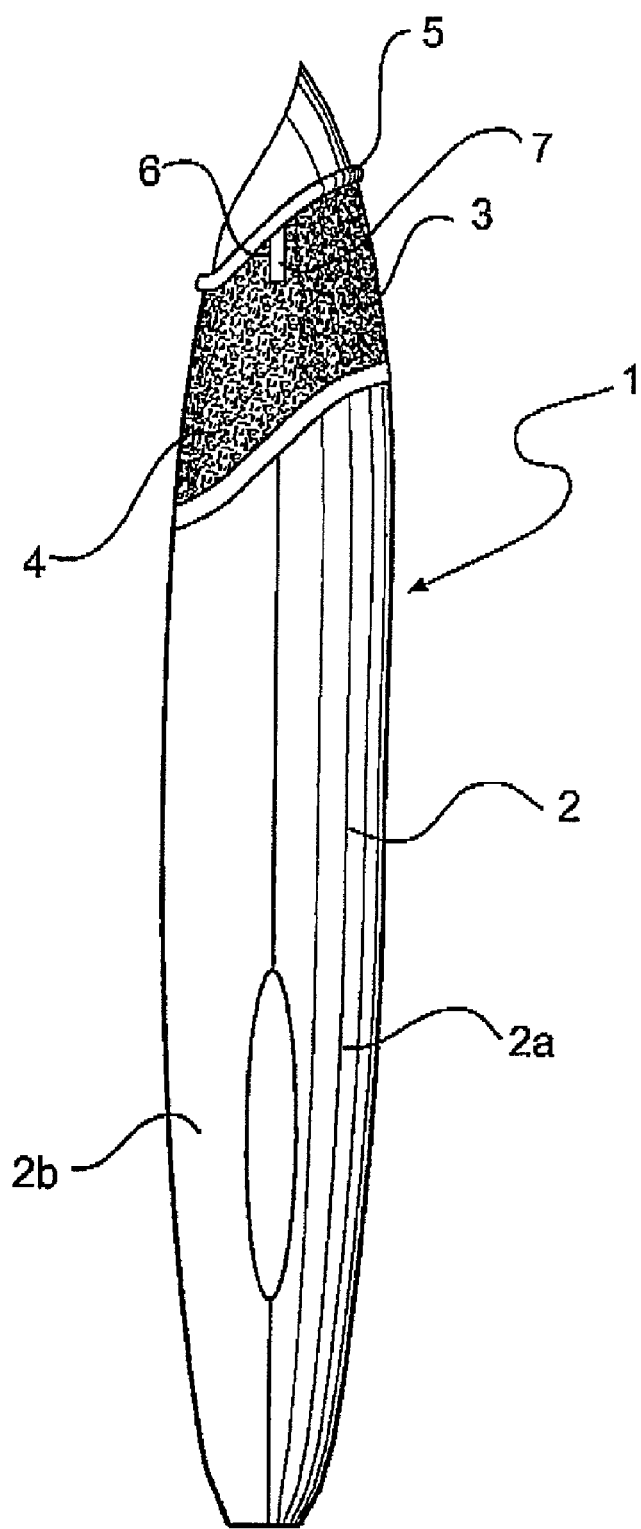
FIG. 1 shows an electronic pen according to the invention.

DESCRIPTION OF A PREFERRED
EMBODIMENT

An electronic pen 1 has a casing 2 which consists of two longitudinal parts 2a and 2b. The two parts 2a, 2b are joined to be openable by means of screw joints (not shown) the head of which is countersunk into the casing 2. Alternatively, the parts 2a, 2b can be dismountably joined by any other suitable means, such as key-type inserts, cooperating hooks and slots, releasable snap fittings, cooperating locking rings and posts, etc. Round the casing 2 of the pen 1, a sleeve-shaped girdle 3 of hard plastic, which is shown shaded, is mounted using a one-way snap function, so that the girdle 3 cannot be removed from the pen without being destroyed. The pen 1 has a conical front portion 4 and the girdle 3 is complementarily conical and is positioned behind a circumferential bead 5 in the casing 2.

The girdle 3 as shown in FIGS. 1-4 is an external, sleeve-shaped component that encloses a portion of the casing along the circumference thereof.

In the girdle 3 there is a slot 6, and in the casing 2 there is an elevated portion in the form of a tongue 7 with which the slot 6 engages.

The girdle 3 is placed on the pen 1 round the casing 2 enclosing a longitudinal portion thereof where a user holds the pen 1 to write/scan/read, within which longitudinal portion the screw joints for joining the casing parts 2a, 2b are positioned. In other words, the girdle 3 covers the screw joints.

Figures 2, 3, 4:
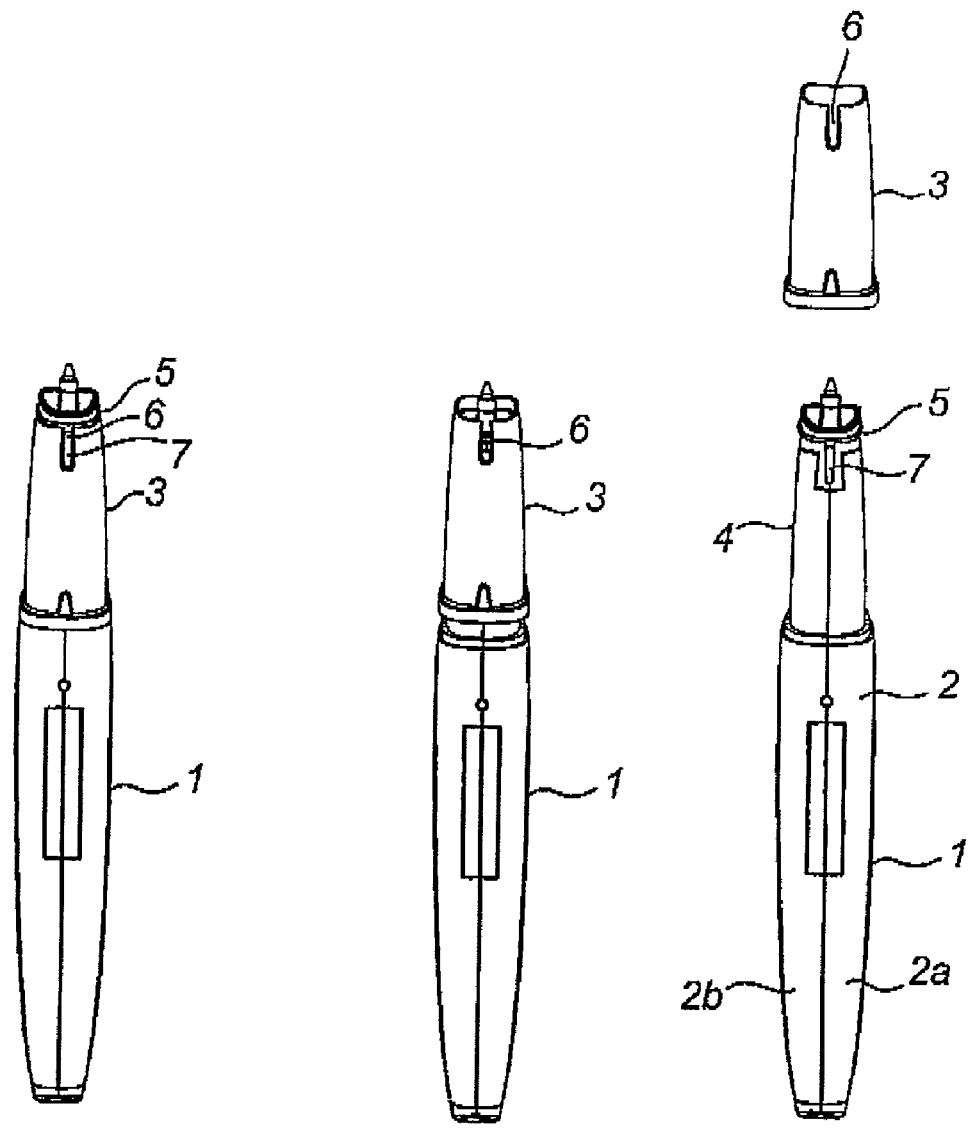
FIG. 2 shows an electronic pen according to the invention in a different angle where the girdle has not yet been placed round the pen.
FIG. 3 shows the pen in a position where the girdle is in an intermediate position before it is placed in its snapped-on position round the pen.
FIG. 4 shows the pen when the girdle is in its snapped-on position round the pen.

As shown in FIGS. 2-4, the girdle 3 is placed in its snapped-on position on the pen 1 by being slipped on to the casing 2 from the front end of the pen, over and past the bead 5. To facilitate the slipping-on of the girdle, the bead 5 can have a conically beveled portion (not shown), and the girdle 3 snaps in behind the circumferential bead 5 at the end of its being slipped on. The flexing which is necessary for the slipping-on is provided by the slot 6 which during or after the slipping-on is made to engage the tongue 7 on the casing, as is shown in FIGS. 3-4.

The girdle 3 cannot be removed from its snapped-on position round the pen 1 unless it is destroyed. This is ensured by the bead 5. When the pen 1 has to be opened for service to be carried out, the destroyed girdle is after the service measure replaced with a new one which is snapped on in the same way as the original one. This method ensures the tamper proof sealing of the pen 1 after authorized opening.

It has been assumed above that the joining plane of the casing parts 2a and 2b extends in the longitudinal direction of the pen 1. However it will be appreciated that the invention is applicable also to pens where the casing parts are joined in a plane transversely of the longitudinal axis of the pen 1, for instance by threading one part into the other, by snap fitting the parts together, or by joining the parts via a bayonet coupling. A girdle can be designed for its tamper proof sealing function for such engagement in the two casing parts as to prevent the casing parts from being screwed apart or allow screwing apart merely by sacrificing itself in a destroying manner.

Also such a variant can be implemented with a groove/bead arrangement on girdle and casing part.

The previously mentioned variants can be designed with a flexible bead combined with a flexing or non-flexing girdle instead of the described flexing girdle with a non-flexing bead. The bead is then designed to flex only when the girdle is being placed around the pen, i.e. it is flexible only in one direction, thus making it impossible to remove the girdle without it being destroyed.

What I claim and desire to secure by Letters Patent is:

1. An electronic pen comprising:
    a casing including at least two casing parts which are joined together in an interlocking manner that is separable;
    electronic equipment arranged inside the casing; and
    a girdle arranged at a determined location on the pen with a close fit around the joined casing parts, said casing and said girdle having a coacting locking arrangement which limit the movement of the girdle in the longitudinal direction of the pen in such manner that at least the girdle is destroyed as the locking is broken.

2. An electronic pen as claimed in claim 1, in which the girdle is recessed in the casing material.

3. An electronic pen as claimed in claim 1, in which the casing is provided with a circumferential bead (5) behind which the girdle is fixed by snap action.

4. An electronic pen as claimed in claim 1, in which the girdle is formed with at least one slot at least at one end.

5. An electronic pen as claimed in claim 4, in which the casing has a tongue which engages in said slot on the girdle.

6. An electronic pen as claimed in claim 1, in which the girdle is arranged over a longitudinal portion of the casing where a user holds the pen when used.

7. An electronic pen as claimed in claim 1, in which the girdle is made of a plastic material selected from thermoplastics or thermosetting plastics.

8. An electronic pen as claimed in claim 1, in which the girdle is made of metal.

9. An electronic pen as claimed in claim 1, in which the girdle is arranged to cover means for the separable joining of the two parts of the casing.

10. An electronic pen as claimed in claim 1, in which the casing has a truncated conical portion on to which a girdle of a corresponding shape is slipped.

11. An electronic pen as claimed in claim 10, in which the girdle is formed with said slot at its narrow end.

12. A method of providing a pen with a tamper proof seal, said pen having a body which comprises at least two casing parts which are joined together in an interlocking manner that is separable, comprising a step of joining the at least of two casing parts together such that they interlock; and slipping a girdle with a close fit on to a correspondingly formed portion of the pen such that said girdle is secured to said casing to form the tamper proof seal while allowing use of the pen.

13. A girdle for providing a pen with a tamper proof seal, said girdle comprising:

a locking arrangement which provides, in coaction with the pen, a locking between the pen and the girdle to limit the movement of the girdle in the longitudinal direction of the pen in such manner that at least the girdle is destroyed as the locking is broken.

14. A girdle as claimed in claim 13, which is sleeve-shaped.

15. A girdle as claimed in claim 13, which has at least one slot at least at one end.

16. A girdle as claimed in claim 13, which is made of a plastic material selected from thermoplastics or thermosetting plastics.

17. A girdle as claimed in claim 13, which is made of metal.

18. A girdle as claimed in claim 13, which has the shape of a truncated cone.

19. A girdle as claimed in claim 18, which is formed with said slot at its narrow end.

* * * * *

UNITED STATES PATENT AND TRADEMARK OFFICE
CERTIFICATE OF CORRECTION

PATENT NO. : 7,671,850 B2
APPLICATION NO. : 10/170542
DATED : March 2, 2010
INVENTOR(S) : Bjorn Fermgard It is certified that error appears in the above-identified patent and that said Letters Patent is hereby corrected as shown below:

ON THE TITLE PAGE:

Insert the following:

-- (30) Foreign Application Priority Data

June 15, 2001 (SE) .................... 0102137-7 --.

Signed and Sealed this

Ninth Day of November, 2010

David J. Kappos
*Director of the United States Patent and Trademark Office*